Patented Dec. 8, 1936

2,063,543

UNITED STATES PATENT OFFICE 2,063,543

PRODUCTION OF REFRACTORY BRICK

Konrad Erdmann, Radenthein, Carinthia, Austria

No Drawing. Application August 3, 1933, Serial No. 683,560. In Austria March 2, 1932

7 Claims. (Cl. 106—9)

The present invention relates to the production of refractory brick from material containing a high percentage of magnesia, which offer substantially greater resistance to abrupt changes of temperature than is the case with the magnesite bricks hitherto obtained when using sintered magnesite as the starting material. The object of the invention is achieved by a particular selection of grain sizes and in combination therewith introducing into the material of the brick, as an effective constituent, a proportion of alumina or aluminum powder or aluminous substances such as bauxite, clay or firebrick. The specific coaction of proper proportioning of grain sizes and of these additions results in a surprisingly sudden increase of resistance to spalling.

Selection of certain grain sizes has often been employed in the ceramic industry, especially for the purpose of obtaining maximum density as a particular property of the refractories. Thus a process has been described for producing particularly dense bricks by partial or complete elimination of an intermediate fraction; but the process concerned does not furnish bricks of unusual resistance to sudden changes of temperature. Nor have any other of the proposals ever yet made with regard to grain sizes resulted in obtaining bricks from dead burned magnesite showing high resistance to spalling.

This resistance is usually tested by heating the brick in an electric furnace to 950° C. for a period of 50 minutes, and thereafter chilling by a blast of cold compressed air at one atm. for five minutes. The numerical values indicate the number of repetitions of heating and chilling cycles endured by the brick without any part of the heated portion splitting away. Tested by this method the best sintered magnesite bricks produced according to the prior art give a spalling value of only 3 to 4, whereas the bricks of sintered magnesite produced in accordance with the present invention give a value of 40 to 60 and even more.

On the other hand it is already known that the addition of aluminous substances improves to a certain extent the resistance of magnesite bricks to abrupt changes of temperature. But though the magnesite bricks prepared with this addition have somewhat greater resistance to spalling than is the case with ordinary magnesite bricks, this improvement is still far from perfect, owing to the unsuitable selection of grain sizes adopted. Moreover, this increased resistance is attained only by the use of a comparatively large addition of aluminous substances, which is attended, however, by a substantial reduction of another important property of the magnesite bricks, namely their resistance to corrosion by slags.

The present invention is based on the discovery that a combination of particular selection of grain sizes with the addition of aluminous material produces a surprising improvement in the spalling resistance of magnesia bricks, and that with an addition of alumina which is so small that the resistance of the brick to the attack of slags is not in the slightest degree inferior to that of an ordinary magnesite brick. In contradistinction to previous proposals for altering the relative proportions of the grain sizes, the present invention does not aim at any appreciable increase in the density of the bricks produced.

With regard to the grain sizes, it is a fundamental rule that, in the ground material as it comes from the mill, the portion below 100 $\mu$ and above 1000 $\mu$ should be substantially increased, either by the addition or elimination of fractions. The quantity of alumina to be added is preferably between 2 and 6% of $Al_2O_3$.

Normally, the fraction below 100$\mu$ in the ground material as it comes from the mill forms about 12 to 25% of the total, the fraction 100 to 1000$\mu$ 40 to 80%, and the fraction above 1000$\mu$ 10 to 30%. According to a particular method of carrying out the invention, the fine and coarse fractions are so far increased in relation to the intermediate fraction that the fine fraction constitutes 20 to 40%, the intermediate fraction 15 to 25% and the coarse fraction 35 to 65% of the total. In a preferred method of carrying out the invention, the marginal grain sizes at the limits of the coarse, intermediate and fine fractions are sorted out and removed, so that, in the finished charge, the difference between the largest grain size in one fraction and the smallest grain size in the next coarser fraction is at least 100$\mu$, and is preferably between 400$\mu$ and 1000$\mu$. When this is done to the upper limit, that is up to 1000$\mu$, the entire intermediate fraction is omitted.

If, for reasons of economy, more modest results in respect of the increase achieved in the resistance to spalling, though still substantially superior to those hitherto attained, be considered sufficient, the specified limits of grades can be displaced upwards by as much as 300$\mu$. At the very most, the fine fraction may contain the grains 1 to 400$\mu$ and the coarse fraction those exceeding 1300$\mu$.

*Example 1*

100 parts by weight of ground magnesian material containing grains of all sizes between 1 and 3000$\mu$ are mixed with 50 parts by weight of fine meal (1 to 100$\mu$) and 100 parts by weight of coarse grains (1000 to 3000$\mu$) of this material and with 2 to 6% of alumina (preferably of a size between 1 and 100$\mu$). After the addition of water and also, if desired, of organic or inorganic binding agents the mixture is molded under a pressure of 200 to 1000 kg. per sq. cm., dried, and baked at temperatures between 1400° and 1600° C. Pure alumina may be replaced by an aluminous substance, such as bauxite, firebrick, clay or the like, in amounts corresponding to the said 2 to 6% of alumina in the mixture. The alumina may also be replaced by aluminium powder in such amount as to furnish the above content of alumina during the firing treatment.

*Example 2*

The ground material (1 to 3000$\mu$) available is graded into three fractions with the approximate ranges of 1 to 100$\mu$, 100 to 1000$\mu$ and 1000 to 3000$\mu$. The charge for pressing is made up from these three fractions in such a manner that the ratio between the fine, intermediate and coarse fractions is 30:20:50. These figures represent mean values which may be varied to the extent of one-third higher or lower. The further treatment is performed in the manner specified above.

The term "normal density" is used in the following claims to indicate that the density (or the porosity) of the resulting bricks remains substantially the same as that of bricks which would result from the same refractory mix as it comes from the mill without any particular gradation of the grain sizes.

*Example 3*

The ground material is graded into three fractions: 1 to 100$\mu$, 100 to 1000$\mu$ and 1000 to 3000$\mu$. The grains between 100$\mu$ and 500$\mu$ are removed from the intermediate fraction and those between 1000$\mu$ and 1500$\mu$ from the coarse fraction, and the charge thus prepared is further treated as set forth in the first example.

While in the specific examples, a ground material is mentioned in which the coarsest particles are of a size of 3000$\mu$, I do not in any way limit the invention to this feature, since the coarsest particles in the ground material to be graded are not limited to any particular dimensions.

By virtue of the above described combination of suitable selection of grain sizes and appropriate addition of alumina the resistance to spalling can be considerably increased also in the case of cold-bound, unburned magnesite bricks, irrespective of whether the binding in the cold has been effected by means of organic binding agents, (such as linseed oil) or inorganic media (such as water glass, magnesium chloride, quick-setting cement or the like).

I use the term baking in the following claims to include both kiln firing and heating to firing temperature in a furnace lining during use, without previous kiln firing.

I claim:

1. A process of producing refractory brick from refractory material containing a high percentage of magnesia which process comprises grading a ground material containing particles ranging from finest powder up to a size of above approximately 1000$\mu$ into a fine fraction consisting of particles of a size up to approximately 100$\mu$, an intermediate fraction consisting of particles of a size between approximately 100 and 1000$\mu$, and a coarse fraction consisting of particles of a size above approximately 1000$\mu$, the relative amounts of the said fractions being so adjusted that the final ratio between the fine, intermediate and coarse fractions is as (20 to 40):(15 to 25):(35 to 65); adding aluminous material to provide in the finished refractory body a percentage of $Al_2O_3$ amounting to 2 to 6%, molding the brick and baking.

2. A magnesite brick highly resistant to heating and sudden cooling, comprising the refractory vehicle in three forms, a fine fraction consisting of particles of a size below approximately 100$\mu$, an intermediate fraction consisting of particles of a size between approximately 100 and approximately 1000$\mu$, and a coarse fraction consisting of particles of a size above approximately 1000$\mu$, the ratio between the fine, intermediate and coarse fractions being as (20 to 40):(15 to 25): (35 to 65), and containing a percentage of aluminous material amounting to 2 to 6%, reckoned as $Al_2O_3$.

3. A process of producing refractory brick from a ground refractory material containing a high percentage of magnesia, which ground material includes a fine fraction composed of particles of sizes smaller than about 100$\mu$, an intermediate fraction composed of particles between about 100$\mu$ and about 1000$\mu$, and a coarse fraction composed of particles above about 1000$\mu$, which comprises adjusting the proportions of said three fractions to give a mixture containing about 20 to 40 parts of said fine fraction, not more than about 15 to 25 parts of said intermediate fraction, and about 35 to 65 parts of said coarse fraction, and at any stage of the treatment bringing the alumina content of said adjusted mixture to about 2 to 6% figured as $Al_2O_3$, and thereafter molding said adjusted mixture into brick and baking the latter.

4. A process as in claim 3, in which there is removed from one at least of the said fractions, a substantial part of the portion thereof which is of a grain size close to the dividing line between that fraction and an adjacent fraction, so that there will exist a substantial jump in grain size between the largest particles in one fraction and the smallest particles in the next coarser fraction.

5. A process as in claim 3, in which the said intermediate fraction is substantially absent.

6. A magnesite brick of normal density, highly resistant to sudden changes in temperature, consisting essentially of aluminous materials in amount between 2% and 6%, figured as $Al_2O_3$, well mixed with a mixture of particles of burned magnesite in two forms, one a fine fraction consisting of particles up to approximately 100$\mu$, and the other a coarser fraction consisting of particles above approximately 1000$\mu$, the latter fraction largely predominating over the former, and omitting substantially all magnesite material of a grain size between 100$\mu$ and 1000$\mu$.

7. A magnesite brick of normal density as claimed in claim 2, in which a substantial portion of at least one of the said fractions is absent, said portion being of a grain size close to the dividing line between that fraction and an adjacent fraction, so that there will exist a substantial jump in grain size between the largest particles in one fraction and the smallest particles in the next coarser fraction.

KONRAD ERDMANN.